United States Patent [19]

Semle et al.

[11] Patent Number: 5,306,347
[45] Date of Patent: Apr. 26, 1994

[54] PROTECTIVE COVER FOR A VEHICLE

[75] Inventors: Arthur B. Semle, Wilbraham; Karl C. Unger, West Springfield, both of Mass.; Kenneth L. Motsinger, Gahanna, Ohio

[73] Assignee: Westvaco Corporation, New York, N.Y.

[21] Appl. No.: 77,385

[22] Filed: Jun. 17, 1993

[51] Int. Cl.$^5$ .......................................... B05C 11/00
[52] U.S. Cl. ................................ 118/504; 118/505; 118/301
[58] Field of Search .............. 118/505, 504, 213, 301, 118/506; 150/166, 167, 154; 296/136, 95.1; 427/282

[56] References Cited

U.S. PATENT DOCUMENTS

| | | |
|---|---|---|
| 3,032,433 | 5/1962 | Lewis et al. |
| 4,795,207 | 1/1989 | Clarke . |
| 4,821,785 | 4/1989 | Rolan . |
| 5,012,760 | 5/1991 | George . |
| 5,167,267 | 12/1992 | McQuaid . |

FOREIGN PATENT DOCUMENTS

| | | | |
|---|---|---|---|
| 0483946 | 5/1992 | European Pat. Off. | 118/505 |
| 106469 | 8/1977 | Japan | 118/505 |

OTHER PUBLICATIONS

"The evolution of conductive coatings", Tappi Journal, Tim Parker and Larry Tighe, Dec. 1990, pp. 86–92.

*Primary Examiner*—W. Gary Jones
*Assistant Examiner*—Brenda Lamb

[57] ABSTRACT

A light weight, disposable enclosure for covering and protecting a vehicle body during refinishing processes comprises a first substantially transparent central panel for covering the top of the vehicle which allows the user to observe the type and color of the vehicle to be refinished, and a heat reflective side panel bonded to the longitudinal side edges of the central panel for covering the front, rear and sides of the vehicle. The heat reflective side panel protects the rubber and plastic trim components of the vehicle from being damaged by heat lamps used to dry paint or the like during the refinishing process.

8 Claims, 3 Drawing Sheets

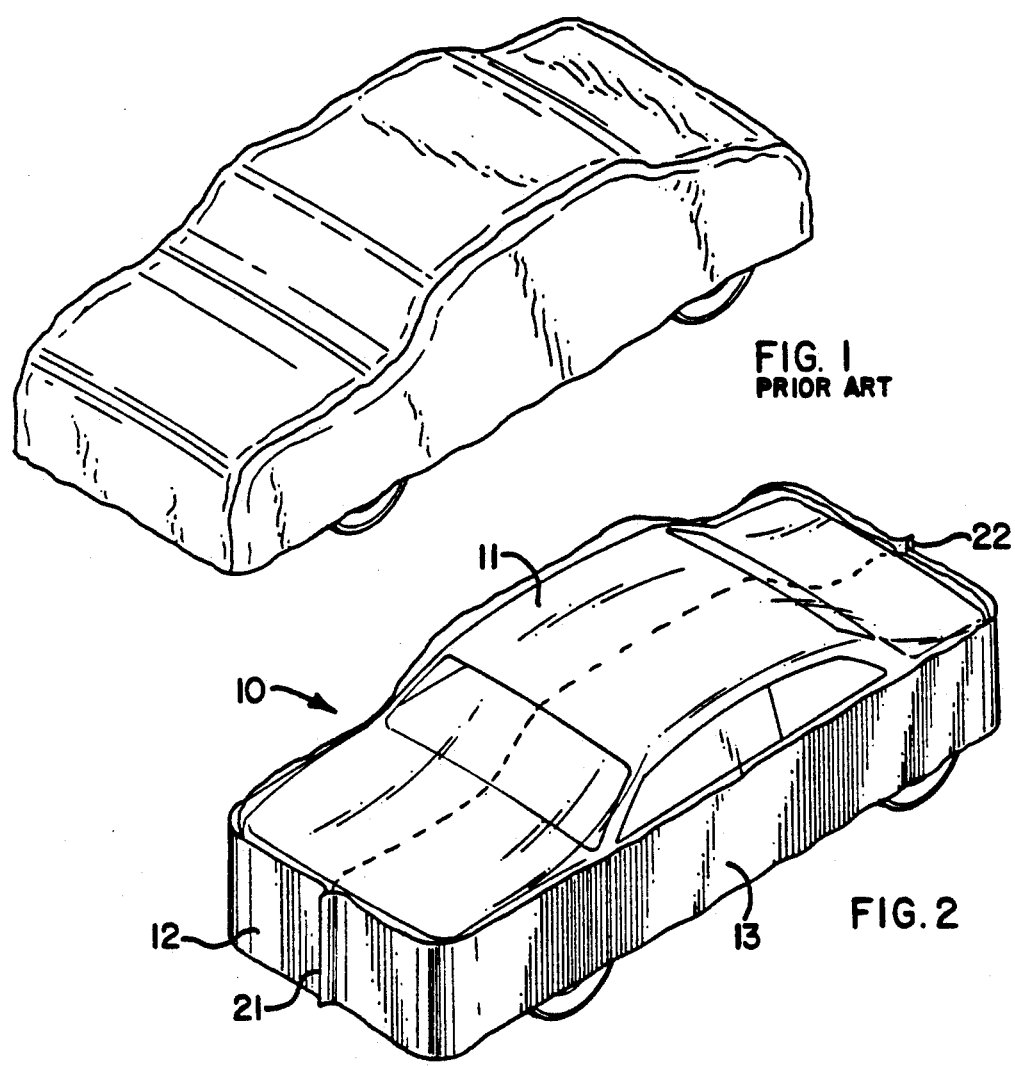

PROTECTIVE COVER FOR A VEHICLE

BACKGROUND OF INVENTION

The present invention relates generally to an enclosure or protective cover for a vehicle, and more particularly to an enclosure for a vehicle for use in refinishing a portion of the vehicle. The enclosure of the invention is intended for use both in conjunction with the repair of damage that occurs during the vehicle manufacturing process and in conjunction with after market repairs.

During the production of a vehicle such as an automobile, the body is assembled and painted before the trim, light assemblies and glass is installed. The painted bodies are oven dried in a dryer using heat lamps to accelerate the drying process. If the body is damaged at any time during the manufacturing process, the damaged part of the body must be repaired before the automobile can be shipped. These repairs are usually done after the automobile is completely assembled so as not to interrupt production. However, there are high labor and materials costs involved in the preparation of an automobile for the repair of damage caused during manufacture, and for after market repairs. The current preparation includes covering heat sensitive automobile parts such as bumpers, light assemblies, glass, trim and tires made from plastic or rubber, with foil and masking tape to reflect the radiant heat from driers used to dry the paint applied to the refinished areas. In addition, it is desirable to cover the rest of the automobile to protect it from paint overspray. Accordingly, the present invention was developed to offset these high labor and materials costs.

In its basic form, the present invention relates to a light weight and disposable cover for protecting vehicle surfaces and components from paints, solvents, heat and other hazards when only a portion of the vehicle body is to be refinished. The enclosure of the present invention is relatively inexpensive and is easily adaptable to fit vehicles of different sizes and shapes. A preferred form of the invention comprises a vehicle cover with a substantially transparent central panel which covers the top portion of the vehicle and allows the user to observe the type and color of the vehicle which is being repaired, and side panels prepared from a heat and radiation reflective material to cover the front, rear and sides of the vehicle and protect the rubber, plastic and trim parts of the vehicle from damage by heat lamps in the paint drying oven.

Car covers in general are well known in the art. U.S. Pat. No. 3,032,433 discloses a process for masking and spray painting an automotive vehicle wherein the cover material includes a cotton cloth coated with a thin layer or a silicone resin containing powdered aluminum. U.S. Pat. No. 4,795,207 discloses a three piece, form fitting cover for a van type vehicle, but fails to disclose the type of material used to make the cover. U.S. Pat. No. 4,821,785 discloses another three piece, form fitting cover for an automobile wherein the cover material is preferably a laminate film of reflective metal located between an outer layer of Mylar and an inner layer of polyethylene which may also include scrim for reinforcement. However the cover disclosed is not intended to be disposable nor does the cover include any portions which are transparent. U.S. Pat. No. 5,012,760 discloses a disposable cover for an automobile intended for use as a preform mask for painting vehicles. The cover in this patent is preferably formed from paper or a combination of paper and a plastic backing. Tear out sections are provided which may be removed to expose predetermined portions of the vehicle for painting. And, finally, U.S. Pat. No. 5,167,267 discloses a patchwork quilt-type car cover of different colors to aid the user in orienting the cover on the vehicle. However in no instance does any of the prior art address the problems solved by the present invention nor does the prior art disclose a cover structure remotely like the vehicle cover disclosed herein.

SUMMARY OF INVENTION

The present invention relates to an enclosure or cover for a vehicle which is designed particularly for use during the refinishing of a portion of the vehicle either at the factory on the production line, or in an independent body repair shop. According to the present invention, the vehicle cover is designed to cover the parts of the vehicle not in need of repair while offering protection to rubber and plastic trim parts of the vehicle which may be exposed to the radiant heating used for drying paint applied to the parts of the vehicle which have been repaired and refinished. By combining metallized side panels which completely surround the vehicle with a centrally located substantially transparent top panel, in the form of a vehicle enclosure or cover, the present invention eliminates the need for separately covering all trim, glass, tire and light assemblies with masking tape prior to refinishing. The clear top panel allows the user to identify the vehicle without removing the enclosure and the part of the enclosure which covers the portion of the vehicle requiring refinishing can be cut out to expose the damaged area. The result is a reduction in labor and materials costs, and a reduction in preparation time.

In a preferred embodiment of the present invention, the vehicle cover comprises a top panel prepared from a substantially transparent, heat resistant material having a width and length slightly greater than the width and length of the vehicle to be covered. In a most preferred embodiment, the top panel is long enough to cover the hood, top and trunk portions of a typical automobile and is wide enough to cover the side windows of the automobile. The material used to make the top panel should preferably be a heat sealable material that might, for example, be selected from the group consisting of polyolefins, polyamides, polyesters and blends thereof. Combined with the substantially transparent top panel are a pair of side panels each having the same length as the top panel and a width substantially wide enough to cover the front, rear and sides of the automobile. The longitudinal edges of the side panels are attached, as for example, by a side seam weld, to the longitudinal side edges of the top panel in a manufacturing operation which also bonds the end edges of both the top panel and the side panels to one another to form the enclosure. The side panel is preferably formed from a heat reflective material, as for example, a heat sealable metallized film selected from the group consisting of polyolefins, polyamides, polyesters and blends thereof. The metallized films may be fabricated using vapor deposition of aluminum or sputtering processes well known in the art. An example of such material is disclosed in the article "The Evolution of Conductive Coatings", by Tim Parker and Larry Tighe, published in the December 1990 issue of TAPPI Journal at pages 86–92, the disclosure of which is incorporated herein by reference. The heat reflective side panels protect the rubber, plastic and other trim parts of the vehicle from being damaged by the heat and radiant energy produced by the oven driers used to dry the paint applied to the refinished areas of the vehicle. As mentioned hereinbefore, the part of the enclosure covering the area of the vehicle to be refinished may be readily cut out to provide access to the damaged area while still providing protection for the remainder of the vehicle.

The enclosure of the present invention may be manufactured by any suitable technique involving the bonding together of the different panels of the cover material. For example a pair of panels of heat reflective heat sealable material having longitudinal edges are arranged one on each side of a central panel of substantially transparent, heat sealable material where the longitudinal edges are bonded together with a side weld. To complete the enclosure, the bonded panels are then folded into face-to-face contact where the ends are bonded together. The enclosures could also be made on a continuous basis by first selecting a web of heat sealable, substantially transparent material having longitudinal edges and bonding to those side edges the side edges of a pair of heat sealable, heat reflective webs. The combined webs of transparent and heat reflective material is then folded and cut into appropriate lengths to align the ends for bonding. In a preferred method, the web of heat sealable, substantially transparent material is folded into a V-shape with its longitudinal edges exposed before they are temporarily overlapped by the longitudinal edges of a pair of heat sealable, heat reflective webs for bonding together in a continuous manner. The excess web material remaining after bonding is removed to provide a side welded seam well known in the art. The bonded webs are then cut into appropriate lengths before the ends are bonded to compete the enclosure. Alternatively, the heat sealable, substantially transparent web which forms the central panel of the enclosure may contain more than one longitudinal fold (accordion-wise) to provide a pleated effect to the central panel allowing it to expand to greater widths from a compact form. The folds may be made before the web for the central panel is combined with the webs for the side panels to conserve space during manufacture provided the longitudinal side edges of the central panel web remain available for bonding to the longitudinal side edges of the webs which form the side panels. The combined webs are then cut into segments to provide preforms for the vehicle enclosure. At that point, the end edges are bonded together to complete the enclosure. In this form, the enclosure is in a flattened condition which is readily folded into a compact size for shipping to the user.

DESCRIPTION OF DRAWING

FIG. 1 is a perspective view of a typical prior art vehicle cover;

FIG. 2 is a perspective view of a preferred embodiment of the vehicle enclosure of the present invention;

DETAILED DESCRIPTION

Referring particularly to FIG. 1, there is shown a typical prior art vehicle cover. As will be appreciated by reference to FIG. 1, when the cover is applied to the vehicle, it obscures the make, model and color of the vehicle, it is not possible to tell the front from the rear of the vehicle, and the tires and the lower part of the body remains exposed.

FIG. 2 by comparison illustrates a preferred embodiment of the present invention wherein the substantially transparent plastic central panel 11 of the vehicle enclosure 10 allows the user to see the color, type and orientation of the vehicle, while the heat reflective side panels 12, 13 of the enclosure completely surround the front, rear and sides of the vehicle including the tires. The use of different materials in the top panel 11 and the side panels 12, 13 of the enclosure 10 of the present invention provides the unique protection for the vehicle desired by the present invention, namely, the protection of substantially the entire vehicle while refinishing only a part of the vehicle exposed by cutting away the portion of the enclosure 10 covering the damaged area of the vehicle.

Figure 3:
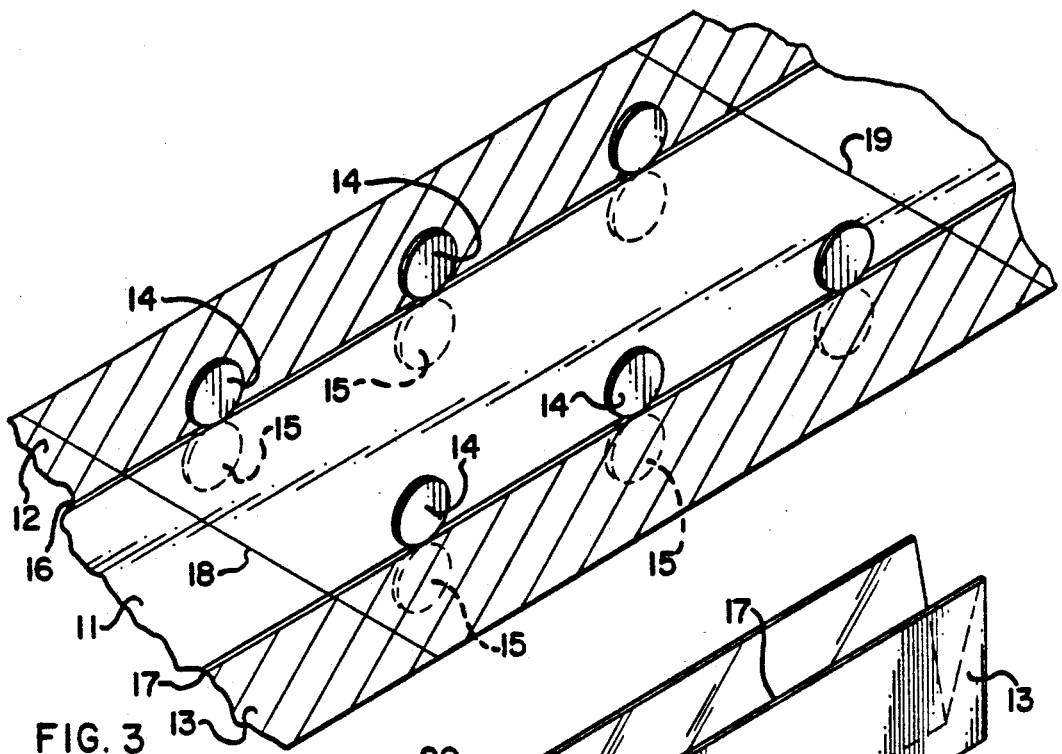
FIG. 3 is a perspective view of a continuous manufacturing process suitable for bonding the longitudinal edges of the webs of material used in forming the enclosure shown in FIG. 2.
Figure 4:
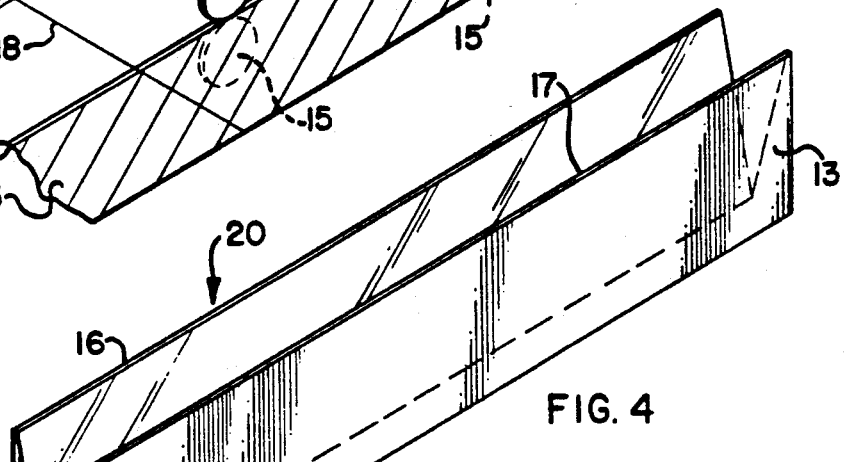
FIG. 4 is a perspective view of a preform cut from the combined webs of material shown in FIG. 3.
Figure 5:
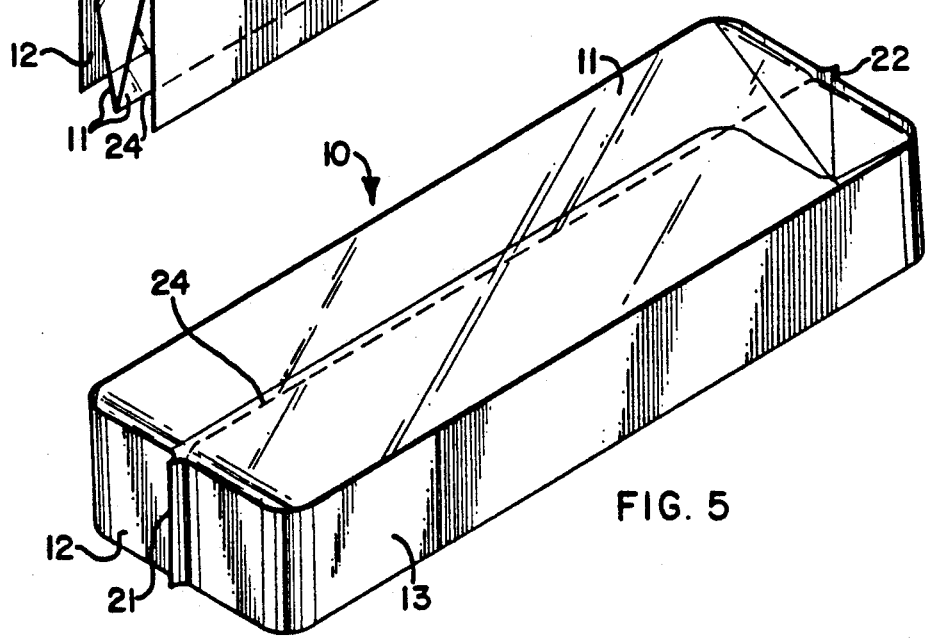
FIG. 5 is a perspective view of the preform of FIG. 4 with its end edges bonded together.
Figure 6:
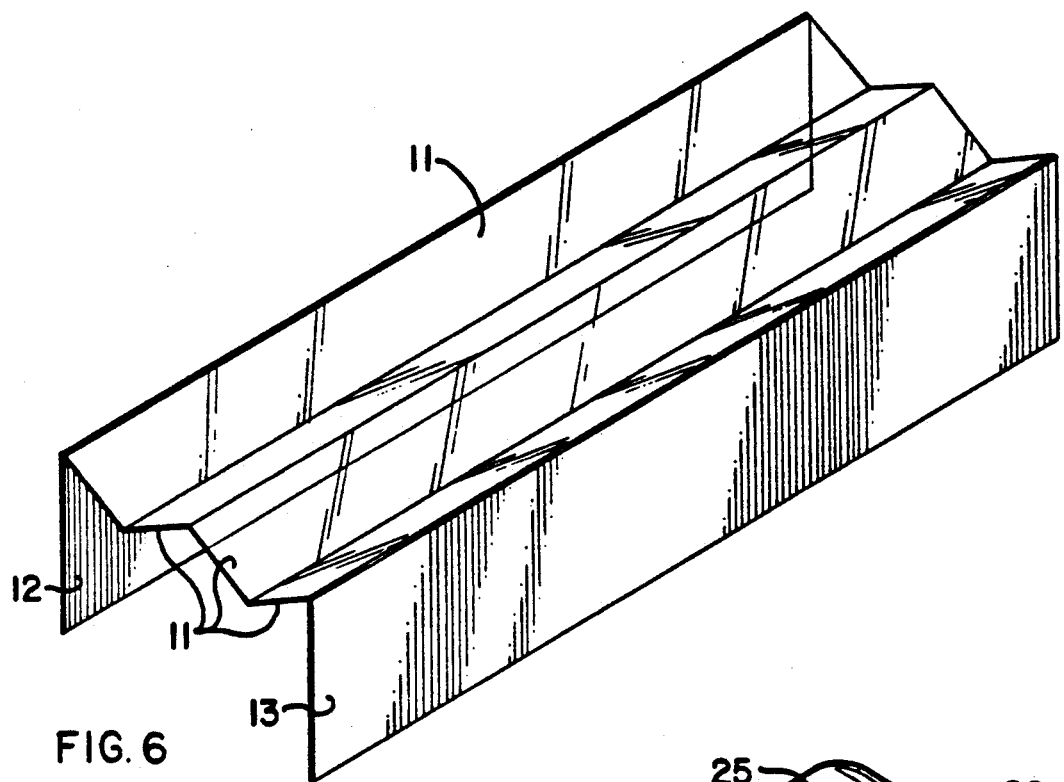
FIG. 6 is a perspective view of a preform showing an alternative embodiment of the present invention; and, FIG. 7 is a perspective view of the preform of FIG. 6 with its end edges bonded together to complete the enclosure.
Figure 7:
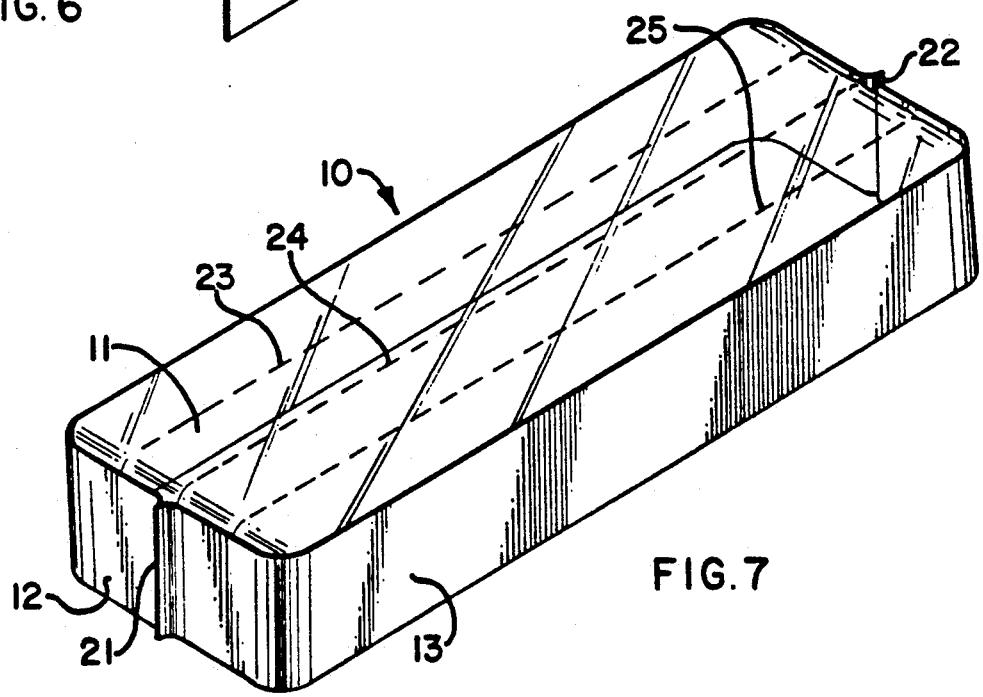

FIG. 3 illustrates an example of how the different materials used in the enclosure of the present invention might be combined. In FIG. 3, a substantially transparent web of film material 11 is combined with a pair of webs of heat reflective material 12, 13 such that a longitudinal edge of each web 12 and 13 is temporarily overlapped by the longitudinal edges of web 11. These overlapped edges are brought into contact with one or more pairs of heat seal devices 14, 15 to create side welded seams 16 and 17 at each longitudinal edge of the central panel 11. Excess material remaining after bonding is removed. The combined webs are then cut as for example at 18, 19 as shown in FIG. 3, into appropriate lengths to provide preforms 20 for the enclosures 10 as shown in FIG. 4. The ends of the preform 20 are then heat sealed together as shown at 21, 22 in FIG. 5 to produce the enclosure 10. As pointed out hereinbefore, to keep the finished size of the enclosure manageable, the central panel 11 may be folded into a V-shape as shown in FIG. 4 along a fold line 24 before the longitudinal heat seals 16, 17 are made. In yet another embodiment of the present invention, the central panel 11 may be provided with a plurality of longitudinal fold lines 23, 24, 25 to provide a multiplicity of folds or pleats to further reduce the size of the materials during the manufacturing process. This embodiment is illustrated in FIGS. 6 and 7.

The combined elements of the enclosure of the present invention eliminates the need to cover or mask any heat sensitive parts of the vehicle body in preparation for a refinishing process which uses heat lamps for drying newly painted surfaces. For this purpose, the side panels of the enclosure are preferably fabricated using a heat resistant, reflective material such as a metallized film, although other materials meeting the heat resistance requirements could readily be substituted. The substantially transparent central panel is also fabricated from a film material, preferably one which has a high enough melting point to withstand the heat from heat lamps used during the paint drying process, yet one which is heat sealable to enable the edges to be bonded to the side panels.

In all forms of the invention anticipated, the final product is intended to be both light in weight and inexpensive so that it is readily disposable after a single use. Thus while the invention has been described with reference to particularly preferred embodiments, it is not intended to be limited thereto, and the appended claims should be interpreted to encompass not only the specific forms and variants shown, but also such other forms that may be obvious to one skilled in the art.

We claim:

1. A disposable enclosure for covering a vehicle comprising, a plurality of planar, substantially rectangular panels, each having longitudinal edges and end edges, said panels comprising:
    (a) a central panel prepared from a substantially transparent material adapted to cover at least the top portion of a vehicle; and
    (b) a pair of side panels prepared from a substantially heat reflective material, said side panels being bonded to the longitudinal edges of said central panel and said central panel and side panels each being bonded to one another at the end edges thereof, whereby the side panels are adapted to cover the front, rear and side portions of a vehicle.

2. The enclosure of claim 1 wherein the central panel has a width and length slightly wider and longer than the width and length of a vehicle.

3. The enclosure of claim 2 wherein the side panels each have a width slightly less than the height of a vehicle and a length substantially equal to the length of the central panel.

4. The enclosure of claim 3 wherein the central panel is formed from a substantially transparent heat sealable film material selected from the group consisting of polyolefins, polyamides, polyesters and blends thereof.

5. The enclosure of claim 4 wherein the side panels are each formed from a heat sealable laminate of a metallized film material selected from the group consisting of polyolefins, polyamides, polyesters and blends thereof.

6. The enclosure of claim 5 wherein the central panel comprises two sections each having the same width and length and the side panels have the same width and length as a central panel section.

7. The enclosure of claim 5 wherein the central panel comprises two sections each having the same width and length and the side panels have a different width but the same length as a central panel section.

8. The enclosure of claim 5 wherein the central panel comprises a plurality of sections the sum of which is a number $n=(1+x)$ where $x=0, 1, 3, 5, 7, 9 \ldots 99$.

* * * * *